United States Patent [19]

Stolarczyk

[11] 3,995,200

[45] Nov. 30, 1976

[54] GROUND MONITOR AND CIRCUIT BREAKER ACTUATING DEVICE

[76] Inventor: Larry G. Stolarczyk, 612 S. 7th St., Raton, N. Mex.

[22] Filed: June 23, 1975

[21] Appl. No.: 589,540

[52] U.S. Cl. .............................. 317/18 B; 317/18 C
[51] Int. Cl.² .......................................... H02H 3/16
[58] Field of Search .............. 317/18 B, 18 C, 18 D, 317/27 A, 146; 324/51; 340/256

[56] References Cited
UNITED STATES PATENTS

| | | |
|---|---|---|
| 3,886,413 | 5/1975 | Dow et al. ................. 317/DIG. 2 X |
| 3,913,010 | 10/1975 | Scarpino .............................. 324/51 |
| 3,934,176 | 1/1976 | Vasudevan et al................ 317/18 C |

*Primary Examiner*—Harry Moose
*Attorney, Agent, or Firm*—Boone, Schatzel, Hamrick & Knudsen

[57] ABSTRACT

A ground monitor and circuit breaker actuating apparatus for monitoring the continuity of the ground and pilot conductors in a power distribution system and for deenergizing the power supply system when a true fault in the ground or pilot conductor occurs, including a DC power supply, an impedance bridge which passes a test signal whenever a bridge imbalance occurs in response to a fault logic signal or a fault in the pilot conductor or the ground conductor, an oscillator which generates a test signal for use by the bridge, a fault logic generator which generates a fault logic signal for causing intermittent unbalancing of the bridge and for use by a pulse rate discriminator, a filter which eliminates spurious signals passed by the bridge, a pulse former which converts the filtered signal into a pulsed fault signal, a threshold detector which passes the fault signal if the voltage level of the pulses exceed a predetermined threshold voltage level, a phase detector and a null output detector which compare the phase relationship between the test signal and the fault signal and which indicate when the bridge is in an unbalanced condition, a pulse rate discriminator which compares the timing of the pulses of the fault signal with the pulses of the fault logic signal and develops a control signal commensurate therewith, and a relay which breaks the circuit of the power system in response to the control signal.

11 Claims, 5 Drawing Figures

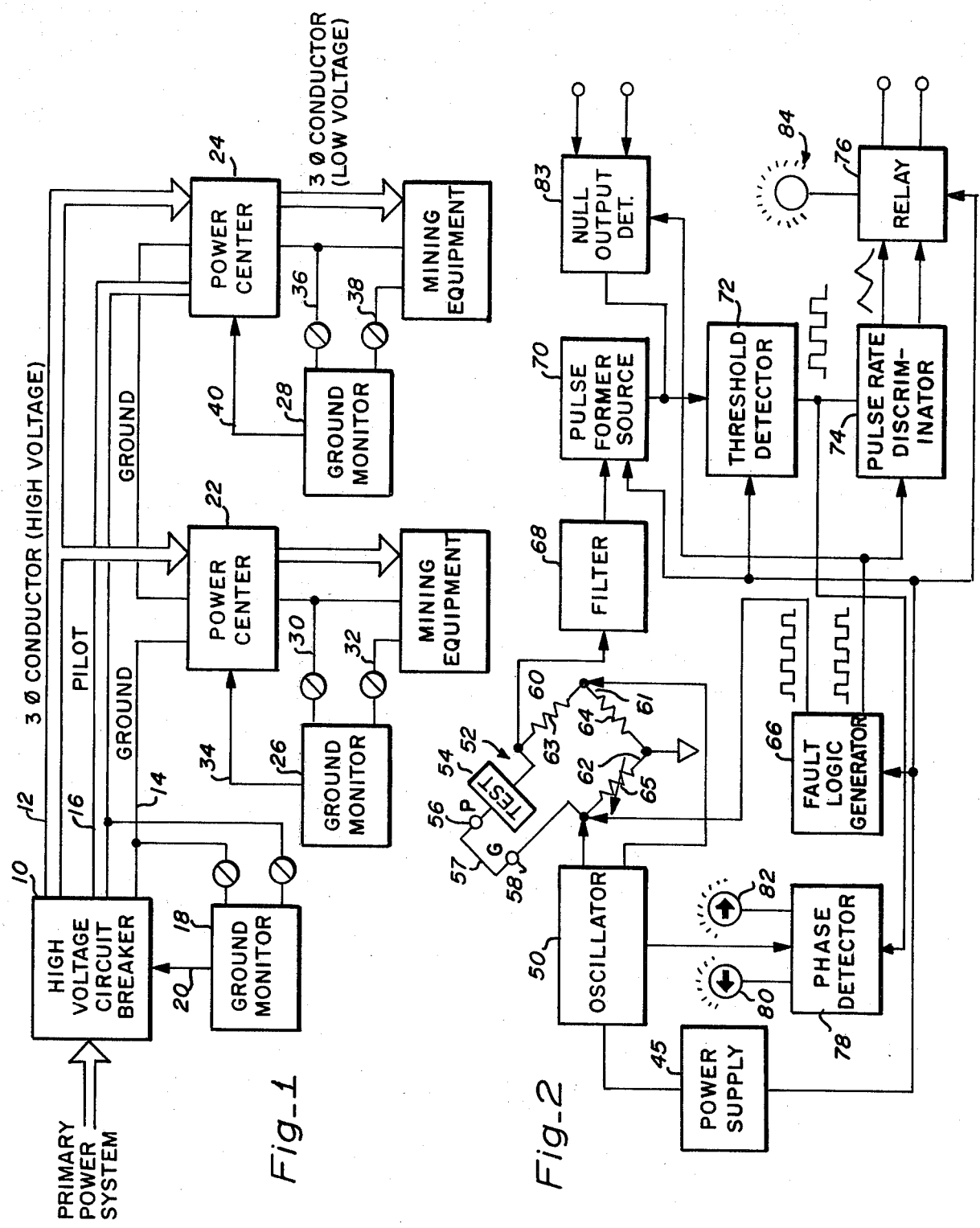

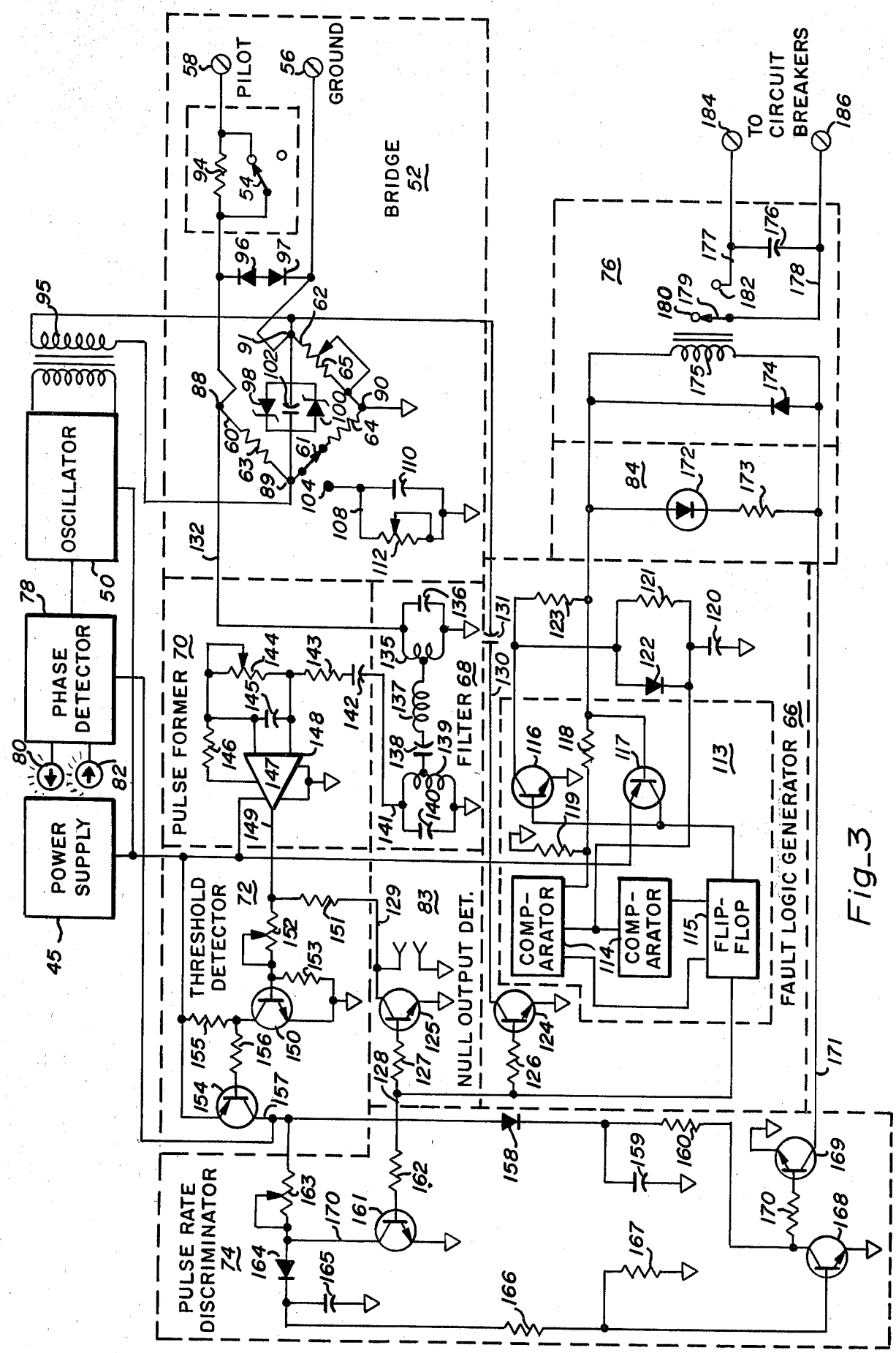
Fig_3

GROUND MONITOR AND CIRCUIT BREAKER ACTUATING DEVICE

BACKGROUND OF THE INVENTION

1. Field of the Invention

The present invention relates generally to electronic monitoring equipment, and more particularly, to an improved ground conductor monitor and circuit breaker actuating device for detecting ground conductor faults in electrical power systems used with electrical mining equipment and other electrical equipment and for generating a trip command to actuate the power system circuit breakers. The preferred embodiment includes a fail safe design to prevent false tripping of the power system circuit breakers from spurious signals present in the pilot or ground conductors of the system as a result of stray DC signals, harmonic signals of the main power signal frequency or induced transients.

2. Description of the Prior Art

In electrical power systems used with mining equipment, it is essential that the power lines be properly grounded to prevent electrical charge buildup in the power system. Sparks caused by an electrical charge buildup in a particular machine or line due to faulty grounding may result in electrical shocks to operating personnel, ignition of volatile gases present in underground mines, or other accidents. Such accidents have potentially catastrophic results to personnel and the equipment.

Ground monitor devices have been developed in an effort to provide a detector for detecting loss of ground continuity in the electrical power system and for deenergizing the system before a hazardous condition develops. However, such monitors typically have the undesirable characteristic of responding to spurious signals commonly present in mining equipment electrical systems, and frequently deenergize the system when a ground fault has not actually occurred.

SUMMARY OF THE PRESENT INVENTION

It is therefore a primary object of the present invention to provide an improved ground monitor and circuit breaker actuating device having a fail safe design which will not accidentally trip the power system circuit breakers in response to spurious signals in the ground circuit.

Briefly, the present invention is directed to a ground monitor and circuit breaker actuating device which includes a DC power supply to supply power to the device; an impedance bridge for passing a test signal whenever a bridge imbalance occurs in response to a fault logic signal or in response to a open-circuit fault in either the pilot or ground conductors; an oscillator for generating the test signal used by the bridge; a fault logic generator for generating the fault logic signal which causes the bridge to become intermittently unbalanced and which is also used as a switching signal by a pulse rate discriminator; a filter for removing spurious signals from the bridge output signal; a pulse former for converting the filtered signal into a fault signal; a threshold detector for passing the fault signal if its pulses exceed a predetermined threshold level; a phase detector and a null output detector for indicating the phase relationship between the test signal and the fault signal and for indicating when their phase difference is representative of an unbalanced bridge; a pulse rate discriminator for developing a control signal if the pulses of the fault signal do not coincide with the pulses of the fault logic signal; and a relay for actuating the circuit breakers of the power system in response to the control signal. The invention monitors the ground and pilot conductors of the power system to detect an increase in their resistance indicating an open circuit or resistive fault. When an increase or fault occurs, a trip control signal is generated which trips the main power circuit breakers thereby deenergizing the power system or isolating the dangerous equipment.

A principal advantage of the present invention is that spurious signals in the ground or pilot conductors caused by stray DC signals, harmonic signals of the main power signal frequency or induced transients are eliminated from the control circuitry to prevent accidental tripping of the power system circuit breakers.

Another advantage of the present invention is that the device may be easily tested to insure its operability without disabling it or disconnecting it from the power system.

A further advantage of the present invention is that malfunctions within the device itself will cause the power system circuit breakers to trip.

Other objects and advantages of the present invention will no doubt become apparent to those skilled in the art after having read the following detailed description of a preferred embodiment which is illustrated in the drawing.

IN THE DRAWING

FIG. 1 is a block diagram illustrating the application of the present invention to an electrical power system of the type commonly used with mining equipment;

FIG. 2 is a block diagram illustrating a preferred embodiment of a ground monitor in accordance with the present invention;

FIG. 3 is a partial block diagram and partial schematic representation of a preferred embodiment of the present invention;

DETAILED DESCRIPTION OF THE PREFERRED EMBODIMENT

Figures 4, 5:
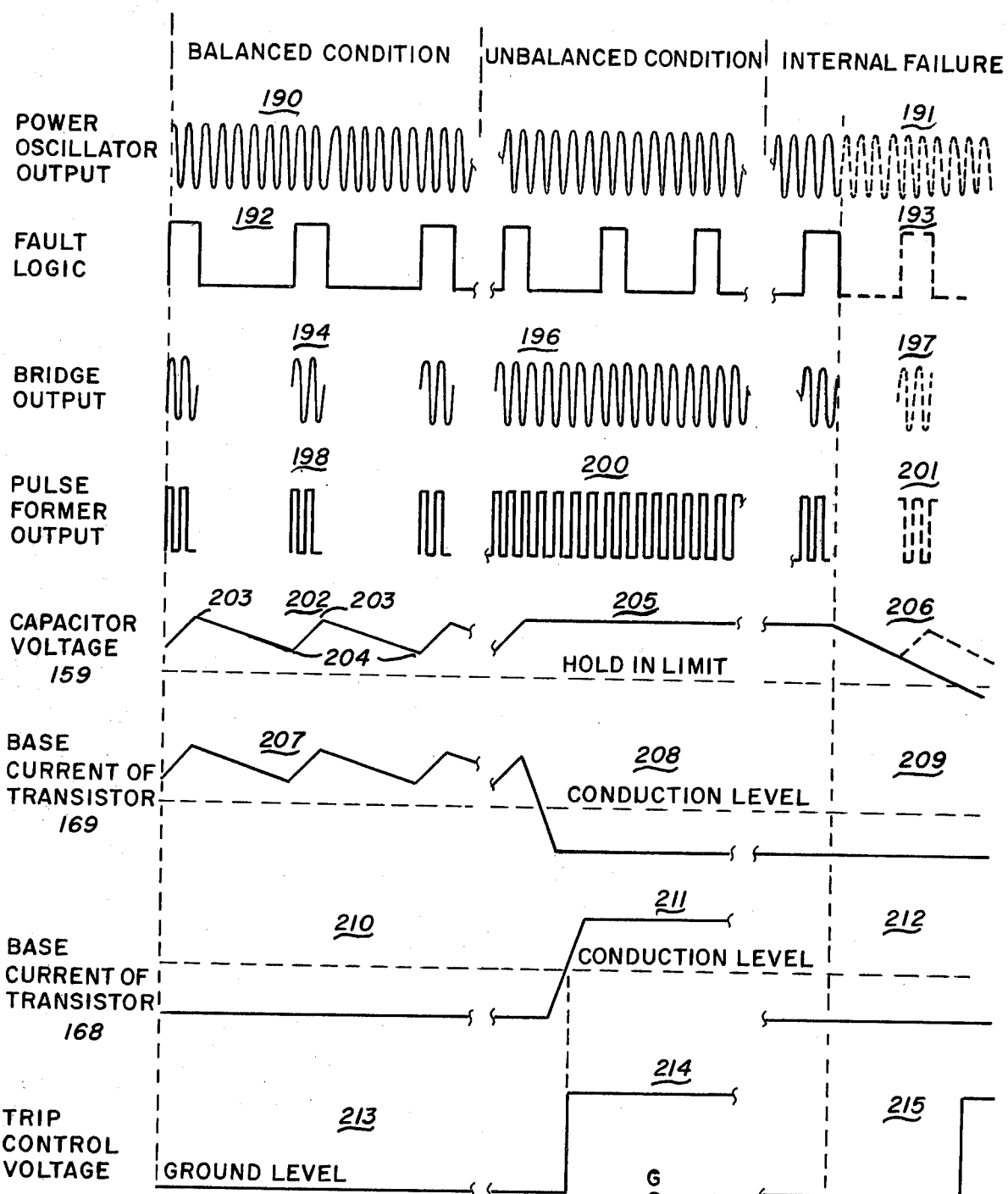
FIG. 4 is a series of waveforms illustrating the various electrical signals developed and used by the ground monitor and circuit breaker actuating device during normal operation, during a ground fault condition, and during an internal failure.
FIG. 5 is a partial schematic diagram illustrating an alternative embodiment of the present invention.

Referring to FIG. 1 of the drawing, a plurality of ground monitor and circuit breaker actuating devices in accordance with a preferred embodiment of the present invention are shown as they are used in a power distribution system for mining equipment. As illustrated, the primary power system supplies power to a high voltage circuit breaker 10. Breaker 10 also serves as a distribution point for the distribution of three-phase, high voltage power to the conductors represented by a line 12. A line 14 represents a grounding line for the three-phase, high voltage power. A line 16 is a pilot line in parallel with the ground line 14 and is coupled to line 14 so as to form a continuous circuit through a set of power centers 22 and 24. One ground monitor device 18 is illustrated connected to the ground line 14 and pilot line 16 of the high voltage subsystem to monitor the continuity of those ground and pilot lines. If a fault should occur during the time that the lines are being monitored, device 18 will send a trip control signal to the high voltage circuit breaker 10 which will result in the high voltage subsystem becoming deenergized.

The typical power system in which the present invention will be used involves both a high voltage and a low voltage subsystem. In the present illustration, the three-phase, high voltage power represented by line 12 feeds into the set of power centers 22 and 24. These power centers contain transformers for transforming the high voltage power to a lower voltage and circuit breakers for disconnecting the low voltage supply if a ground fault should occur in that subsystem.

As depicted, one ground monitor device is used to monitor each low voltage system, i.e., a device 26 is associated with the power center 22, and a device 28 is used with the power center 24. Device 26 is connected with a low voltage ground line 30 and a low voltage pilot line 32. As described above, device 26 monitors the continuity of ground line 30 and pilot line 32. Whenever a fault occurs in either line, device 26 generates a trip control signal on a line 34 which causes the circuit breakers within power center 22 to trip, thus isolating the low voltage power system from the non-grounded mining equipment. Similarly, device 28 monitors a low voltage ground conductor 36 and a low voltage pilot conductor 38. Device 28 generates a control signal on a line 40 to isolate that subsystem whenever a fault occurs in either of those conductors.

FIG. 2 illustrates, in block diagram form, a ground monitor device in accordance with the preferred embodiment of the present invention. The ground monitor device includes a DC power supply 45; a low power oscillator 50; an impedance bridge network 52 having a test switch 54; a pair of terminals 56 and 58, a set of impedance legs 60, 61 and 62 having impedance elements 63, 64 and 65, respectively; a fault logic generator 66; a filter network 68; a pulse former network 70; a threshold detector network 72; a pulse rate discriminator network 74; a relay 76; a phase detector network 78; indicator lights 80, 82; a null output detector 83; and a balance indicator 84. The low frequency oscillator 50 is a sinusoidal signal generator for generating a low level test signal for use in monitoring the pilot and ground conductors. The test signal is a steady state signal with a frequency remote from that of the harmonic signals of the main power signal frequency. Thus, the test signal is distinct from spurious signals present in the pilot or ground conductors, e.g., stray DC signals or harmonic signals of the main power signal frequency.

The DC power supply 45 is a full-wave bridge rectifier circuit which developes a 9 volt DC output from a 12.0 volt AC input. The DC power supply provides DC power to the oscillator 50, fault logic generator 66, pulse former 70, threshold detector 72 and relay 76.

Bridge network 52 may be in the form of a Wheatstone bridge or a Maxwell bridge configuration. The Wheatstone configuration may be used for short distance power transmission applications where the transmission line impedance is substantially resistive. The Maxwell configuration may be used for long distance power transmission appliations where there is significant inductive impedance. In the bridge network 52, the pilot and ground conductor path impedances comprise the unknown element or leg 57. The variable impedance element 65 of leg 62 is adjusted in the Wheatstone configuration to compensate for the pilot and ground conductor impedances and to allow detection of impedance changes in the leg which includes the ground and pilot conductors. The elements 63 and 64 in legs 60 and 61 are fixed impedance elements. The fixed element values are chosen to make it possible for the element 65 to balance the bridge when the ground and pilot conductors are introduced into the circuit.

The test switch 54 in bridge 52 acts essentially as a resistor bypass switch. Test switch 54 is operated by depressing a button on the front panel of the device which causes an appropriate resistive element to be introduced into the leg of the bridge having the pilot and ground conductors. The introduction of this resistance creates a resistive increase in the ground-pilot circuit and simulates a potentially dangerous open-circuit fault in the ground conductor.

Fault logic generator 66 includes an astable oscillator for developing an output voltage signal (fault logic signal) with a predetermined duration and repetition rate. The functions of the fault logic signal will be discussed in detail below. However, one function of the fault logic signal is to cause intermittent unbalancing of the bridge 52 so that the bridge develops an output test signal.

The filter 68 may be a narrow band-pass filter suitable for filtering a low power sinusoidal signal and is tuned to the frequency of the signal generated by oscillator 50. Since only signals of the same frequency as the test signal generated by oscillator 50 are passed by filter 68, spurious signals, e.g., stray DC signals or harmonic signals of the main power signal frequency are eliminated from the input to pulse former 70 and the rest of the ground monitor circuit.

The pulse former 70 is in the form of an amplifier for amplifying signals having the same frequency as the test signal. Biasing of the amplifier of pulse former 70 is such that the test signal pulses received from filter 68 drive the amplifier into saturation, resulting in the generation of a series of voltage pulses having the same time phase as the test signal pulses.

Voltage pulses from pulse former 70 provide the input to threshold detector 72 which compares the voltage level of the voltage pulses to a preset voltage level, and develops an output signal if the voltage pulses exceed the preset level. The output of threshold detector 72 and the fault logic signal from fault logic generator 66 are fed to the pulse rate discriminator 74. When the fault logic signal is at a high voltage level the pulse signals passed by threshold detector 72 are used to develop a signal indicative of normal operation. When pulse signals from the threshold detector 72 occur when the fault logic signal is at low voltage level, discriminator 74 develops a control signal which acts through a relay 76 and ultimately causes the circuit breakers of the electrical power system to deenergize or isolate the system.

The relay 76 may be a mechanical relay and is used in the preferred embodiment to operate the circuit breakers of the electrical power system being monitored. While the signal from the discriminator 74 indicates normal operation of the power system, the relay contacts or relay 76 are in an engaged position. Whenever the signal from discriminator 74 indicates that an open-circuiit fault has occurred in the ground or pilot conductors, relay 76 is deenergized. When relay 76 is deenergized its contacts change state and a trip control signal is sent to the circuit breakers of the power system.

The phase detector 78 is essentially a time phase comparison circuit for comparing the output signal phase of the oscillator 50 with the output signal phase of threshold detector 72. According to their phase relationship, detector 72 indicates whether more or less impedance in the adjustable elements of bridge 52 is necessary to achieve an equilibrium state. The threshold detector 72 output voltage signal phase will be leading in phase with respect to the oscillator signal phase whenever the unknown bridge impedance is lower than the balancing impedance and will be lagging in phase whenever the unknown impedance is more than the balancing impedance.

Detector 78 includes two indicator lights 80 and 82. The lights indicative, respectively, whether more or less impedance is necessary in the adjustable element of either leg 62 or leg 64 of bridge 52 to realize equilibrium in the bridge circuit.

Null output detector 83 is also used to balance bridge 52 to the unknown impedance. A suitable meter (not shown) connected to detector 83 indicates when a signal is output from pulse former 70 which is out of phase with the pulse logic signal from generator 66. So long as there are out of phase components of the output signal from bridge 52, bridge 52 is not properly balanced.

The adjustable element of either leg 64 or leg 62 of the bridge 52, used to compensate for the unknown impedance of the pilot and ground conductors, is adjusted until neither light 80 or 82 is illuminated and a null output is detected. With neither light illuminated the balance indicator lamp 84 and the relay 76 are energized indicating that the bridge is balanced and that no further adjustments are necessary to compensate for the unknown pilot and ground conductor elements.

Referring now to FIG. 3, a partial block diagram and partial schematic representation of a round monitor and circuit breaker actuating device in accordance with the present invention is illustrated. The power supply 45, the oscillator 50, the phase detector 78 and the indicator lights 80 and 82 are shown by block diagram representation because they are well known in the electronic art. However, the remainder of the circuit is depicted by schematic representation.

Bridge network 52 includes four terminals 88, 89, 90 and 91, at the ends of legs 60, 61 and 62, respectively. Resistive elements 63, 64 and 65 are within legs 60, 61 and 62, respectively. The test switch 54, with an internal resistor 94, is attached between terminals 58 and 88. A pair of back-to-back diodes 96 and 97 extend across the lines to switch 54 and terminal 56. A pair of diodes 98 and 100 are in parallel with one another and with a capacitor 102 between terminals 89 and 91. A switch 104 is in series in leg 61. An alternate circuit 108 containing a capacitor 110 and a variable resistor 112 is also provided. Bridge 52 is inductively coupled to oscillator 50 through a transformer 95 such that the oscillator signals from oscillator 50 are impressed upon the two bridge corners 89 and 91.

Resistor 94 is a test resistor equal to the recognizable resistance limit of the device. Generally, resistor 94 has been found to be either approximately 2.5 ohms or 4 ohms, depending upon the application to which the ground monitor and circuit breaker actuating device is applied. If a high voltage power line ground conductor is being monitored, resistor 94 is approximately 4 ohms. If the monitor is used with a low voltage system, resistor 94 is approximately 2.6 ohms. These constraints are chosen to comply with U.S. Government sensitivity specifications.

Whenever there is an exceedingly high transient voltage induced in the pilot or round conductors, the resulting voltage will appear across resistor 63 of the bridge network 52 due to the conducting characteristics of diodes 8 and 100. In order to prevent damage to resistor 63 during fault conditions, back-to-back zener diodes 96 and 97 limit the peak voltage potential between the pilot and round conductors to one diode junction voltage plus the zener voltage. If the potential between the pilot and ground conductors should exceed the voltage limit, diodes 96 and 97 will become conductive, thus preventing any further increase in potential.

Diodes 98 and 100 and capacitor 102 are included to prevent high voltage transients from being conducted into the output circuits of oscillator 50. High voltage transients may be present in fault situations. The diode configuration limits the voltage transients between terminals 89 and 91 of the bridge network 52 to 0.7 volts. Capacitor 102 prevents fast voltage transients from building up across the diode pair.

As depicted, bridge network 52 is in a Wheatstone configuration, for short distance power system applications. Switch 104 enables the conversion of bridge 52 from a Wheatstone to a Maxwell configuration. Switch 104 removes resistor 64 from the bridge circuit and introduces circuit 108 containing the parallel combination of a capacitor 110 and the variable resistor 112 in its place. In the Maxwell configuration bridge 52 will balance out impedance components due to induction as well as resistance. Inductive impedance may be caused by long distance power transmission circuits. Adjustable resistor 65 is adjusted with adjustable resistor 112 to balance bridge 52 in the Maxwell configuration.

As was previously indicated, the design of the present invention inclues a fault detector network for insuring fail safe operation. The fail safe feature is accomplished by periodically simulating an actual ground conductor open-circuit fault. In the preferred embodiment, fault logic generator 66 generates a fault logic signal which is used to simulate a ground conductor fault. The fault logic signal is also used to divert the simulated fault signal from the trip command circuitry. Fault logic generator 66 includes an integrated circuit 113, having a pair of comparators 114, a flip-flop 115, an NPN transistor 116, a PNP transistor 117, and a voltage divider including a resistor 118 and a resistor 119; a control network having a capacitor 120 in series with the parallel combination of a resistor 121 and a diode 122, also in series with a resistor 123; an NPN transistor 124, connected as a transistor switch with a grounded emitter; and an input resistor 126. The control network determines the duty cycle of the fault logic signal which is a short duration pulse appearing on a line 128.

During the time period that the output of integrated circuit 113 is high, a positive voltage potential is being applied to the input resistor 126 which in turn causes a current flow into the base of transistor 124. The increased base current causes transistor 124 to become conducting, thus grounding corner 1 of bridge 52 through a capacitor 131. This grounding of a line 130 sequentially causes leg 62 of bridge 52 to be bypassed. The shunting of leg 62 in turn causes an output test signal to be developed by the bridge network 52 on a line 132 for each pulse generated by generator 66.

Null output detector 83 includes a transistor 125, and a resistor 127, and is connected to an external device, such as an AC volt meter, to aid in balancing the bridge 52. The bridge 52 output signal appearing at terminal 88 is amplified by the pulse former network 70 and appears on a line 149. The amplified replica of the bridge 52 null signal is applied through a resistor 151 to the null output detector 83. The amplified bridge signal can be monitored during initial bridge 52 balancing. During the time period that the fault logic signal from integrated circuit 113 is high, a positive voltage potential is being applied to resistor 127, causing a current to flow into the base of transistor 125. The increased base current in turn causes transistor 125 to become conducting, thus grounding line 129. Since the positive voltage is contemporaneous with the grounding of terminal 91 of bridge 52, the unbalanced bridge signal appearing on line 149 is prevented from reaching the output of null dectector 83.

The filter 68 filters the signals developed on line 132 and includes a parallel combination of an inductor 135, and a capacitor 136, in series with a series combination of an inductor 137 and a capacitor 138, in series with a second parallel combination of an inductor 139 and a capacitor 140. The bandwidth of filter 68 is chosen to match the frequency of the test signal generated by oscillator 50. Thus, the output of filter 68 on a line 141 consists of signals having a frequency equal to the frequency of the test signal generated by oscillator 50. Therefore, spurious signals in the pilot or ground conductors, e.g., stray DC signals or harmonic signals of the main power signal frequency, are eliminated by filter 68 and do not reach the input to pulse former 70.

Pulse former 70 forms the signals on line 141 from filter 68 into pulse signals and includes a biasing network having an input capacitor 142 in series with a resistor 143, in series with the parallel combination of an adjustable resistor 144, a capacitor 145 and a resistor 146. Pulse former 70 also includes an integrated circuit amplifier 147 having an input 148. Capacitor 142 is used to prevent the DC bias current of the amplifier 147 from flowing to ground. Capacitor 145, which is connected in parallel with the negative feedback resistor 144, provides a low impedance negative feedback path for high frequency signals. The parallel combination of capacitor 145 and resistor 149 determines the high frequency roll-off characteristic of the amplifier 147. The ratio of resistor 144 to resistor 143 determines the preamplifier gain, and resistor 146 determines the power amplifier gain. The total voltage gain is determined by the product of the preamplifier and power amplifier gains. The sensitivity or gain of amplifier 147 is set by adjusting resistor 144. When resistor 144 is properly adjusted, the signals received from filter 68, which exceed a preset voltage level, drive amplifier 147 into a saturated condition. Thus, signals applied to amplifier 147 at input 148 appears at the pulse former output on line 149 as voltage pulses rather than bursts of sinusodial signals.

The threshold detector 72 allows voltage level discrimination of the pulse former output signals on line 149 and includes an NPN transistor switch 150 having a biasing network including a resistor 152 and a resistor 153. Detector 72 also includes a PNP transistor 154 having a biasing network including a resistor 155 and a resistor 156. The resistor 152 is adjustable and is used to select the amplifier 147 output voltage threshold level at which current begins to flow into the base of transistor 150 causing transistor 150 to begin conducting. The conduction of transistor 150 in turn causes base current to flow from the transistor 154 through resistor 156 and then to ground through transistor 150.

During balanced bridge operation the pulse former 70 output on line 149 is biased to a level of about 4 volts and includes voltage fluctuations due to random voltage level variations. These variations are superimposed over a very small leakage test signal. Whenever an occasional transient signal occurs, or when bridge 52 is unbalanced, the test signal components level increases. Each time the voltage level of a pulse developed in response to a test signal component exceeds the threshold level, threshold detector 72 generates an output voltage pulse. The width of the pulse is equal to the length of time that the instantaneous value of the pulse on line 149 exceeds the minimal level. This pulse signal is output on a line 157 to the pulse rate discriminator 74 and the phase detector 78.

Pulse rate discriminator 74 includes a diode 158 in series with the parallel combination of a pump-up capacitor 159 and a resistor 160; an NPN transistor switch 161 with a grounded emitter having an input resistor 162; an adjustable resistor 163 in series with a diode 164; and the parallel combination of a trip level capacitor 165 and a voltage divider composed of a resistor 166 and a resistor 167. Discriminator 74 also includes an NPN transistor switch 168 with a grounded emitter and a collector connected to the junction of the series connection of the bias resistors 160 and 170. Transistor 168 provides a discharge current path from the pump-up capacitor 159 which bypasses the base of the NPN transistor switch 169. The flow of base current into the transistor switch 169 causes transistor 169 to conduct thereby energizing relay 76. Adjustable resistor 163 determines the amount of current which will flow to capacitor 165 during a fault condition and thus, the true constant of the voltage buildup on capacitor 165. When the voltage level of capacitor 165 exceeds a second threshold level determined by the voltage divider resistors 166 and 167, base current flows into transistor switch 168 causing transistor switch 168 to conduct. With transitor 168 conducting, any current flowing through resistor 160 is shorted to ground. The diversion of current flow from resistor 170 and the base of transistor 169 causes relay 76 to open and thereby generates the trip control signal. Thus, it should be appreciated that resistor 163 regulates the time delay period between the occurrence of a ground or pilot conductor fault and the sending of a trip signal to the power system circuit breakers.

In addition to receiving the output from threshold detector 72 on line 157, discriminator 74 also receives a fault logic signal from the fault logic generator 66 on the line 128. The fault logic signal determines the state of transistor 161. Whenever the positive output of integrated circuit 113 is coincident with the output of detector 72, current flows through resistor 162 to the base of the transistor switch 161. Transistor 161 then conducts the current flowing through resistor 163 to ground via a line 170. By grounding line 170, no current flows to capacitor 165. Thus, no voltage is developed on capacitor 165, but the detector 72 output still charges capacitor 159 through diode 158. The resulting voltage level on capacitor 159 determines the current flowing to the base of transistor 169 and is such as to maintain transistor switch 169 in a conducting state. Conversely, when pulses appear on line 157 which are not coincident with the positive output of integrated circuit 113, as when a ground fault has occurred, current flows through resistor 163, diode 164, and charges capacitor 165. Diode 164 prevents the discharge of capacitor 165 by the shorting action of the transistor switch 161. If the voltage level on capacitor 165 reaches a second threshold level, transistor switch 168 conducts and current flowing through resistor 160 is diverted to ground. Thus, the conduction of transistor switch 169 is terminated and a control signal is developed on line 171.

When the bridge is balanced, only an occasional pulse, caused by induced transients in the pilot and ground conductors, will be generated by detector 72. However, when bridge 52 is unbalanced, the threshold detector output pulse rate increases rapidly. This difference in pulse rate is the principle reason that the present invention is able to discriminate between illegitimate transient signals and unbalanced bridge signals. If bridge 52 is balanced with detector 72 generating only occasional pulses, capacitor 165 will not charge to a voltage level high enough to reach a second threshold level, thereby preventing a control signal from being developed. To develop a control signal, pulses from detector 72 must occur in the absence of a positive output from circuit 113 and must be so numerous as to charge capacitor 165 to the second threshold, or turn-on level, of transistor switch 168.

If an internal failure should occur in the ground monitor and circuit breaker actuating device, e.g., due to a failure in power supply 45, the voltage level on capacitor 159 will decay. When the level falls below the voltage level necessary to keep transistor 169 conducting, a control signal will be generated.

An indicator lamp 84 is provided in the present embodiment, and includes a light emitting diode (LED) 172 in series with a current limiting resistor 173. Under normal operating conditions, with transistor 169 conducting, the LED 172 will be illuminated. Illumination of LED 172 gives an indication of normal operation on the face of the housing of the ground monitor and circuit breaker actuating device. When transistor 169 stops conducting due to a fault or an internal failure, the LED 172 stops glowing, informing any observer that a malfunction has occurred.

The normally energized state of relay 76 insures that a trip control signal will be generated under fault conditions or if an internal failure occurs. Relay 76 includes a diode 174 in parallel with a coil 175; a capacitor 176 across a pair of conductors 177 and 178, a contact arm 179 for engaging either a contact 180 or a contact 182, and a set of output terminals 184 and 186. Diode 174 is provided to short out the high reverse induction voltage developed by coil 175 when it deenergizes. Capacitor 176 serves to eliminate the voltage spikes caused by the interaction of arm 179 with contact 180 or contact 182. The power system circuit breakers are connected to terminals 184 and 186. So long as transistor 169 conducts, coil 175 is energized and arm 179 is held against contact 180. If transistor 169 stops conducting, coil 175 becomes deenergized and arm 179 swings from contact 180 to contact 182, causing a trip control signal to be sent to the circuit breakers of the power system.

FIG. 4 illustrates various waveforms generated and used by the ground monitor and circuit breaker actuating device in accordance with the preferred embodiment of the present invention. Waveforms are illustrated for three operating conditions, the condition when bridge network 52 is balanced, the condition when bridge network 52 is unbalanced, and the condition when an internal failure has occurred in the device, e.g., a failure in the power supply or other circuit component. The waveform 190 represents the sinusoidal test signal generated by oscillator 50. This signal is a continuously generated fixed frequency sinusoid unless the device suffers an internal failure. The waveform 192 represents the fault logic signal generated by fault logic generator 66. This signal is a constant stream of positive-going pulses so long as no internal failure occurs. If an internal failure occurs, either the test signal or the fault logic signal, or both, will not occur, as depicted by the broken line waveforms 191 and 193, respectively.

The bridge 52 output, as seen on line 132 of FIG. 3, is shown by waveforms 194 and 196. In the balanced state, the bridge output is a series of sinusoidal signal bursts 194. The signal bursts 194 coincide with the pulses of the fault logic signal 192. However, in the unbalanced bridge state, the bridge 52 output is a continuous sinusoidal signal as represented by the waveform 196. Conversely, when the device experiences an internal failure, such or an oscillator failure, no signal is developed, as depicted by the broken line waveform 197.

The output signal from threshold detector 72, which is the bridge 52 output signal after having been filtered by filter 68 and formed by pulse former 70, is also illustrated in FIG. 4. That signal is represented by the waveform 198 to include a series of pulse bursts when bridge 52 is balanced. When bridge 52 is in the unbalanced condition, as in waveform 200, the signal has more pulses per second than portion 198. The signal is a null output when an internal failure occurs as represented by the broken waveform 201.

The voltage on capacitor 159 of discriminator 74, as previously described, is dependent upon the voltage pulses from detector 72. As depicted by the waveform 202, the pulses from detector 72 charge capacitor 159 through diode 158 to the level 203. After cessation of the detector pulse, the voltage decays to the voltage level 204 due to the current drain of transistor 169. The rate of the output pulses of detector 72, during normal monitor operation (bridge balanced), are such as to keep the voltage level of capacitor 159 above the hold-in limit of transitor switch 169. The waveform 205 represents the voltage on capacitor 159 when a bridge 52 imbalance occurs due to a pilot or ground conductor fault. As exemplified, the voltage level on capacitor 159 still stays at a sufficient voltage level to maintain transistor 169 in a conducting state. When an internal failure occurs in the device, as shown in the broken waveform 206, voltage pulses from detector 72 cease, and the voltage level on capacitor 159 decays, due to the current drain of transistor 169, until it falls well below the hold-in level of transistor switch 169.

The current flowing into the base of transistor switch 169 from capacitor 159 is illustrated by the waveforms 207, 208 and 209. The waveform 207 depicts the base current level of transistor 169 to be above the level necessary for conduction during balanced bridge conditions. However, when an unbalanced bridge condition occurs, as shown in the waveform 208, the current flowing to the base of transistor switch 169 is diverted to ground, through the collector of transistor switch 168, and the base current of transistor 169 falls well below that level necessary to maintain conduction. Similar to the capacitor 159, when the ground monitor and circuit breaker actuating device suffers an internal failure the current flowing to the base of transistor 169 decreases, as depicted in the broken waveform 209, until the level is below that required to maintain conduction.

The corresponding currents that flow into the base of transistor switch 168 are illustrated by the waveforms 210, 211 and 212. During balanced bridge operation there is no current flowing into the base of transistor switch 168, as depicted in the waveform 210. When a bridge imbalance occurs, as illustrated by waveform 211, capacitor 165 begins charging. Soon the voltage level of the capacitor 165 exceeds the second threshold limit and sufficient current flows into the base of transistor switch 168 to drive it into conduction. When transistor 168 conducts, the base current of transistor switch 169 is diverted to ground. Conversely, if the ground monitor should lose power, or undergo a similar internal failure, as illustrated by waveform 212, base current would not flow into the base of transistor switch 168. However, transistor 169 would still cease conduction, as described above.

Finally, the trip control voltage signal seen on line 171 and controlled by transistor 169 is shown by the waveforms 213, 214 and 215. That signal is at a ground potential level during the time interval that bridge 52 is in a balanced condition, and is at the supply voltage level when an unbalanced bridge condition or an internal failure occurs. With line 171 at a ground potential, current will flow through coil 175 (FIG. 3) energizing relay 76. However, when line 171 reaches the supply voltage level current no longer flows through coil 175. With coil 175 deenergized, arm 179 of relay 76 moves from contact 180 to contact 182 generating a trip control signal which activates the circuit breakers of the power system.

In operation, terminals 56 and 58 of the ground monitor and circuit breaker actuating device are connected to the ground and pilot conductors of the power system to be monitored, forming a conductor loop. Relay terminals 184 and 186 are connected to the power system circuit breakers. Switch 104 is set to the appropriate setting for the type of system being monitored. Resistor 65 is adjusted until phase detector lights 80 and 82 are extinguished, there is a null output from null output detector 83, and balance indicator light 84 is illuminated. At this point, bridge network 52 is balanced to the unknown impedance of the pilot and ground conductor circuit and a steady state condition exists.

Fault logic generator 66 generates a fault logic signal which periodically grounds line 130. Grounding line 130 forces terminal 91 of bridge network 52 to a ground voltage level and essentially shunts leg 62 and resistive element 65. By intermittently shunting leg 62, a pulse signal is developed on line 132 which consists of an amplitude modulated sinusoidal wave with a carrier frequency equal to the frequency of the signal generated by oscillator 50. The pulse signal coincides with the fault logic signal (waveform 192). The pulse signal is filtered by filer 68 to remove spurious DC and harmonic signals, then shaped by pulse former 70 and passed by threshold detector 72 to pulse rate discriminator 74. The voltage pulses of the signal charge capacitor 159 of discriminator 74, thereby maintaining transistor 169 in a conduction state, preventing a trip control signal from being generated.

Should a fault occur in the ground and pilot conductor circuit, the bridge imbalance will be constant. The constant imbalance results in a continuous output on line 132 of a signal equal in frequency to the frequency of the test signal. In this situation, capacitor 165 will charge to a maximum DC voltage level. When the voltage level reaches that second threshold level required to turn on transistor 165, transistor 169 will stop conducting and trip control signal will be developed. The trip control signal will actuate the power system circuit breakers and either deenergize the system or isolate the power system from the dangerous circuit.

Should an internal failure occur in the ground monitor and circuit breaker actuating device, pulse rate discriminator 74 will receive no voltage pulses from detector 72. Capacitor 159 will discharge and a trip control signal will be developed, as previously described, which will deenergize or isolate the relevant power circuit.

In an alternative embodiment, illustrated by FIG. 5, a reed relay contact 300 across switch 54 of bridge 52 is utilized to provide the fault simulation signal. Relay 300 is controlled by transistor 124 (see also FIG. 3), and opens the contacts to switch 54 which introduces test resistance 94 into the ground conductor circuit. Transistor 124 is in turn controlled by the signal from fault logic generator 66. Thus, the necessity of grounding one leg of bridge 52 is eliminated. Also, since resistor 94 has a value equal to the minimum recognizeable impedance of the device, a fault simulation signal is provided which monitors the continuity of the pilot and ground conductors and the resistance sensitivity limit of the ground monitor and circuit breaker actuating device.

While what has been described is considered at the present time to be a preferred embodiment of the present invention, it should be understood that the foregoing disclosure is not to be considered limiting, and the appended claims are intended to cover all such modifications and alterations of the illustrated embodiment as fall within the true spirit and scope of the present invention.

What is claimed is:

1. A ground monitor and circuit breaker actuating apparatus for monitoring the ground and pilot conductors of an electrical power system and for tripping circuit breakers in the power system when an open-circuit fault occurs, comprising:
first signal generating means for generating a sinusoidal test signal having a fixed frequency;
second signal generating means for generating a first set of fault logic pulses and a second set of fault logic pulses;
impedance bridge means including a first terminal, a second terminal, a third terminal and a fourth terminal, said bridge means further including a first impedance leg connected between said first terminal and said second terminal, a second impedance leg connected between said second terminal and said third terminal, and a third impedance leg connected between said third terminal and said fourth terminal, the respective impedances of said impedance legs being selected to balance the bridge when the pilot and ground conductors are connected to form a fourth impedance leg between said first and fourth terminals, said first signal generating means being connected between said first and third terminals and said second signal generating means being connected in one of said impedance legs, whereby the voltage developed across said second and fourth terminals varies as a continuous sinusoid when a fault occurs in said fourth leg and varies in sinusoid bursts when no fault occurs in said fourth leg;

band pass filter means coupled to said impedance bridge means and having a pass band for rejecting signals with frequencies other than said test signal frequency;

pulse forming means responsive to said filtered test signal and operative to develop a fault signal pulse coincident with each cycle of said filtered test signal;

pulse rate discriminator means responsive to said second set of fault logic pulses and said fault signal pules and operative to develop a control signal when said fault signal pulses occur in between said fault logic pulses, said control signal being indicative of an open-circuit fault in the ground or pilot conductors of the power system being monitored; and actuating means responsive to said control signal and operative to actuate circuit breakers to deenergize the power system when a fault occurs in the ground and pilot conductors.

2. A ground monitor and circuit breaker actuating apparatus as recited in claim 1 and further comprising phase detector means responsive to said test signal and said fault signal pulses and operative to indicate a phase difference therebetween which is indicative of an unbalanced condition in said impedance bridge means so that said impedance bridge means may be adjusted to the unknown impedance of the ground and pilot conductors.

3. A ground monitor and circuit breaker actuating apparatus as recited in claim 1 wherein said first leg of said impedance bridge means includes a first resistive element, said second leg includes a second resistive element, and said third leg includes an adjustable resistive element, which together with the ground and pilot conductors form a Wheatstone bridge configuration.

4. A ground monitor and circuit breaker actuating apparatus as recited in claim 1 wherein said first leg of said impedance bridge means includes a first resistive element, said second leg includes a first adjustable resistive element in parallel with a capacitive element, and said third leg includes a second adjustable resistive element, which together with the ground and pilot conductors form a Maxwell bridge configuration.

5. A ground monitor and circuit breaker actuating apparatus as recited in claim 1 and further comprising threshold detector means for comparing the voltage levels of said fault signal pulses with a predetermined threshold volage level and for passing only those fault signal pulses which exceed the threshold voltage level, thereby determining the sensitivity of the actuating apparatus.

6. A ground monitor and circuit breaker actuating apparatus as recited in claim 1 wherein said impedance bridge means further includes a test switch in said fourth leg, a resistive element connected in parallel with said test switch, and a relay means responsive to said first set of fault logic pulses and operative to open said test switch and introduce said resistive element into said fourth leg thereby simulating a resistive fault in the ground or pilot conductors.

7. A ground monitor and circuit breaker actuating apparatus for monitoring the continuity of an electrical power system ground and pilot conductor loop and for sending a trip control signal to the power system circuit breakers if an open-circuit fault or an increase in impedance above a predetermined level occurs in the pilot or ground conductors, comprising:

signal generating means for generating a sinusoidal test signal having a predetermined frequency;

timing signal generating means for generating a first timing signal and a second timing signal;

impedance monitoring means coupled to said signal generating means for monitoring the impedance of the ground and pilot conductor loop, said monitor having a continuous test signal output when an increase in impedance occcurs and having a test signal burst, pulsed output when no increase in impedance occurs;

fault simulation means responsive to said first timing signal and operative to introduce an impedance element in the ground and pilot conductor loop;

filter means coupled to said impedance monitoring means for filtering said test signal and for passing a filtered test signal;

pulse forming means responsive to said filtered test signal and operative to form a fault signal including voltage pulse portions commensurate with the cycles of said filtered test signal;

pulse rate discriminator means for discriminating between said fault signal caused by said fault simulation means and said fault signal caused by an increase in the impedance of the ground and pilot conductor loop by comparing said fault signal with said second timing signal, said discriminator means developing a control signal if said fault signal occurs in the absence of said second timing signal; and circuit breaker actuating means responsive to said control signal and operative to develop a trip control signal, whereby the power system circuit breakers are opened when an open-circuit fault in the ground and pilot conductor loop occurs.

8. A ground monitor and circuit breaker actuating apparatus as recited in claim 7 and further comprising phase detector means responsive to said test signal and said fault signal and operative to indicate a phase difference therebetween which is indicative that said detector is not monitoring the ground and pilot conductors.

9. A ground monitor and circuit breaker actuating apparatus as recited in claim 7 wherein said impedance monitoring means includes a first resistive element, a second resistive element, and an adjustable resistive element, which together with the ground and pilot conductors form a Wheatstone bridge configuration.

10. A ground monitor and circuit breaker actuating apparatus as recited in claim 7 wherein said impedance monitoring means includes a first resistive element, a first adjustable resistive element in parallel with a capacitive element, and a second adjustable resistive element, which together with the ground and pilot conductor loop form a Maxwell bridge configuration.

11. A ground monitor and circuit breaker actuating apparatus as recited in claim 7 and further comprising threshold detector means for comparing the voltage level of said fault signal pulses with a predetermined threshold voltage level and for passing those fault signal pulses which exceed the threshold voltage level, thereby determining the sensitivity of the actuating apparatus.

* * * * *

UNITED STATES PATENT OFFICE
CERTIFICATE OF CORRECTION

Patent No. 3,995,200  Dated November 30, 1976

Inventor(s) Larry G. Stolarczyk

It is certified that error appears in the above-identified patent and that said Letters Patent are hereby corrected as shown below:

Column 4, line 64, "open-circuiit" should read --open-circuit--;

Column 5, line 38, "round" should read --ground--;

Column 6, line 5, "round" should read --ground--;

Column 6, line 8, "8" should read --98--;

Column 6, line 11, "round" should read --ground--;

Column 6, line 63, after "current" insert --to--;

Column 6, line 65, "1" should read --91--;

Column 7, line 59, "appears" should read --appear--;

UNITED STATES PATENT OFFICE
CERTIFICATE OF CORRECTION

Patent No. 3,995,200          Dated November 30, 1976

Inventor(s) Larry G. Stolarczyk

It is certified that error appears in the above-identified patent and that said Letters Patent are hereby corrected as shown below:

Column 9, line 19, "principle" should read --principal--;

Column 11, line 64, "filer" should read --filter--;

Column 13, line 19, "pules" should read --pulses--; and

Column 13, line 56, "volage" should read --voltage--.

Signed and Sealed this

Twenty-first Day of June 1977

[SEAL]

*Attest:*

RUTH C. MASON
*Attesting Officer*

C. MARSHALL DANN
*Commissioner of Patents and Trademarks*